A. L. SHAW.
PORTABLE BUCKET CONVEYER.
APPLICATION FILED NOV. 4, 1918.
1,432,917.
Patented Oct. 24, 1922.
2 SHEETS—SHEET 2.
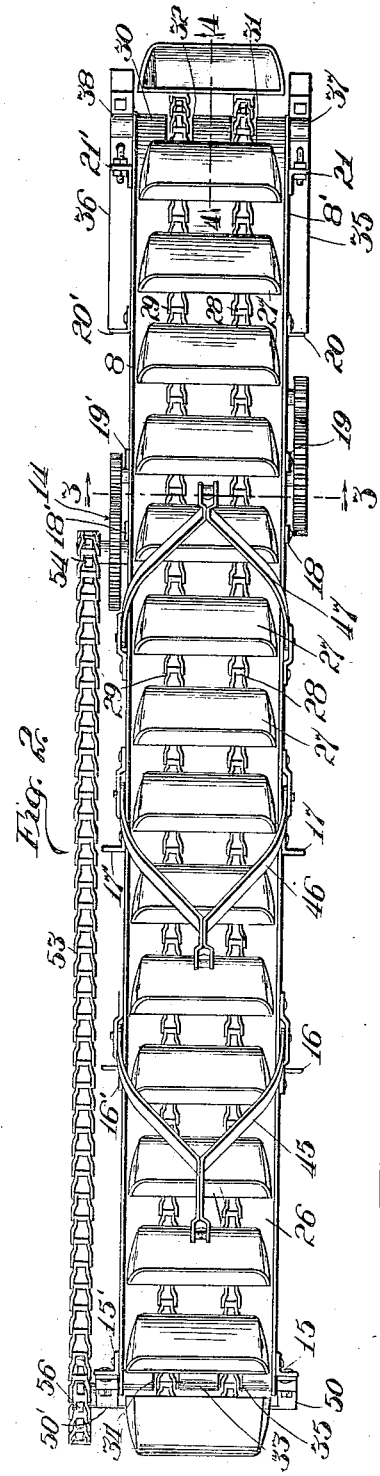
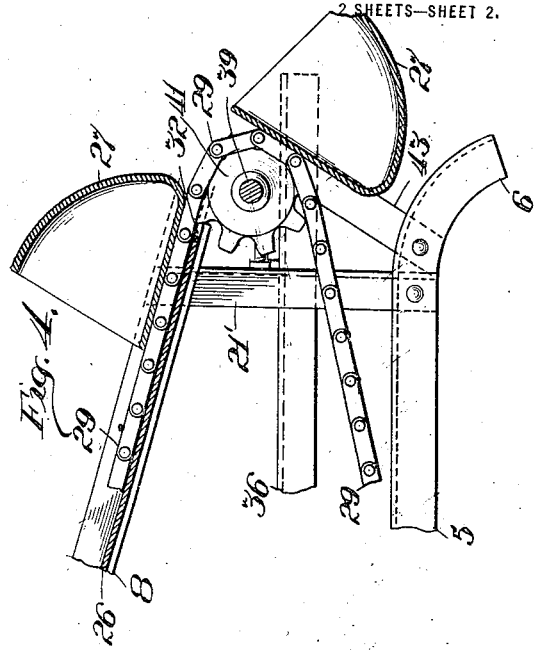
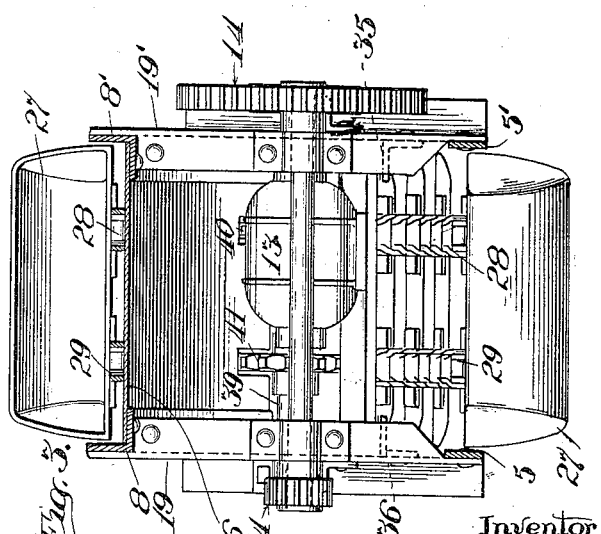
Inventor
Arthur L. Shaw
Attorneys Patented Oct. 24, 1922.

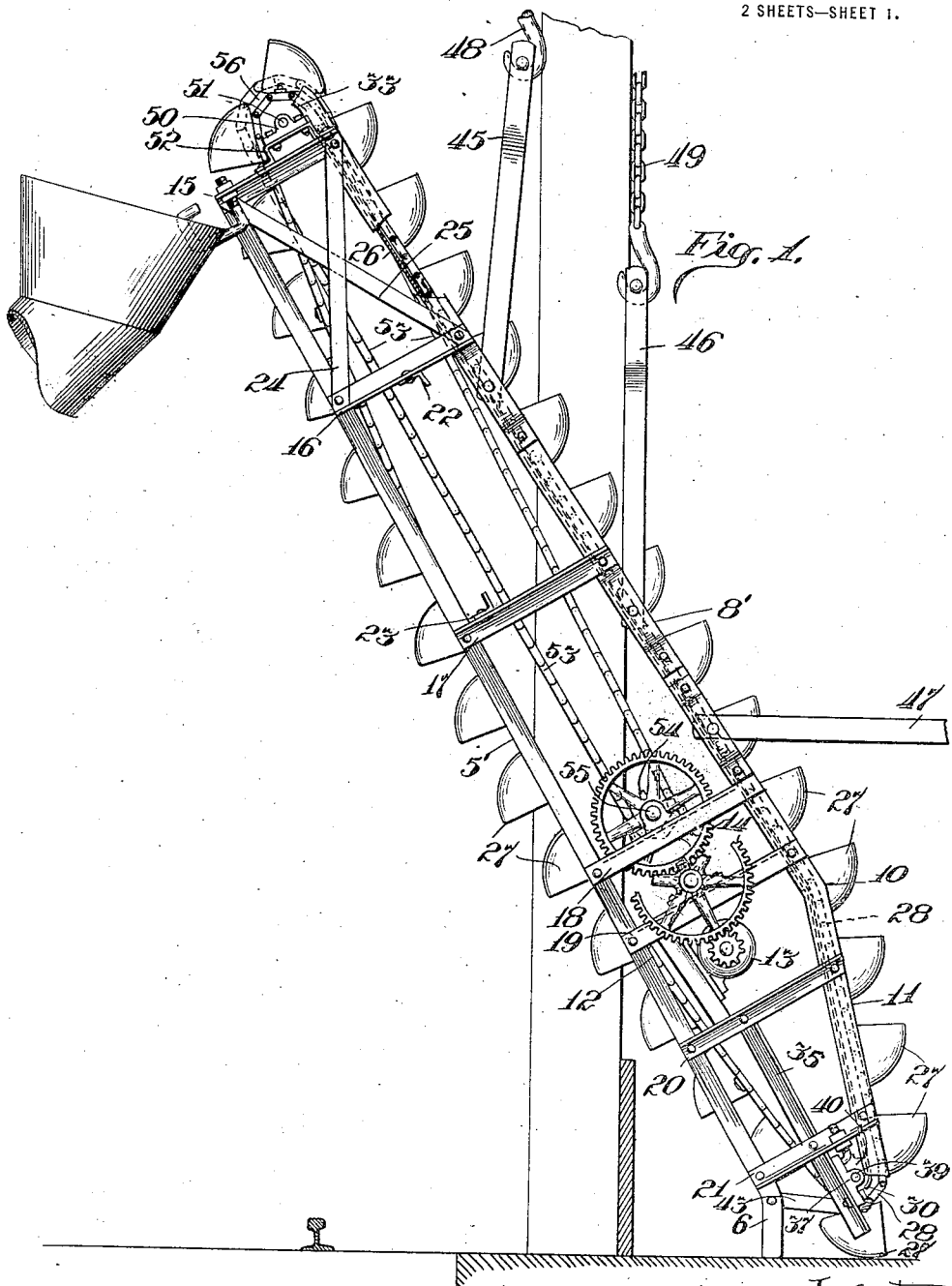

1,432,917

UNITED STATES PATENT OFFICE.

ARTHUR L. SHAW, OF CHICAGO, ILLINOIS, ASSIGNOR TO CHICAGO AUTOMATIC CONVEYOR CO., OF CHICAGO, ILLINOIS, A CORPORATION OF ILLINOIS.

PORTABLE BUCKET CONVEYER.

Application filed November 4, 1918. Serial No. 260,962.

*To all whom it may concern:*

Be it known that I, ARTHUR L. SHAW, a citizen of the United States, residing at Chicago, in the county of Cook and State of Illinois, have invented certain new and useful Improvements in Portable Bucket Conveyers, of which the following is a specification.

My invention relates to portable bucket conveyers.

One of the objects of my invention is to generally improve portable conveyers of the bucket type.

A more specific object is to produce a simplified form of frame, cheap to construct, upon which the buckets may be placed in position convenient for loading and a back plate coacting with the buckets to retain the contents thereof therein; a structure that facilitates the operation of placing it in position by providing fixed legs on its receiving end upon which the conveyer rests when placed to convey and elevate materials, leaving space between the frame of the conveyer and the floor upon which it rests sufficient for the free passage of the buckets.

And still another object of my invention is to reduce the weight of the conveyer, consistent with sufficient stability and strength, so that it may be more easily and conveniently transported from place to place.

The conveyer is used, generally, for the purpose of loading and unloading cars, or for use in conveying and elevating materials, such as coal, sand, gravel, stone and other such materials in bulk.

Owing to the changing environment in which the conveyer may be placed for use, and the further fact that it is very desirable to be able to handle the conveyer without the necessity of employing a number of men for the purpose, it is necessary that it shall be so universal in character and so light in weight, that it may readily be moved from place to place and re-established quickly in operative position.

In the accompanying drawings

Fig. 1 is a side elevation of a conveyer in position for operation, as when unloading cars.

Fig. 2 is a plan view of the conveyer.

Fig. 3 is an enlarged transverse section taken on line 3—3 of Fig. 2.

Fig. 4 is an enlarged fragment taken on line 4—4 of Fig. 2.

In all the views the same reference characters are employed to indicate similar parts.

The conveyer has a rigid frame including two parallel rectangular bottom bars 5 and 5', out-turned at their lower ends, as at 6, to provide a pair of feet upon which the conveyer rests when in the operative position, shown in Fig. 1. The length of these feet is sufficient to permit the buckets to pass between the base or floor upon which they rest, and the adjacent portion of the frame around which they pass. Two parallel top angle bars 8 and 8' constitute the upper portion of the frame. These bars are bent, preferably, as at 10, to provide a knee or part 11 of the conveyer, so that the buckets traversing the range between the lower receiving end of the conveyer and the knee 11 are more nearly in a vertical position when the conveyer is in operation, as shown in Fig. 1, and therefore they can more conveniently be filled. Between the pairs of frame member bars 5 and 8, at the points 10 and 12, they are further separated to provide an enlarged space for the motor 13 and the transmission gearing 14. The bars 5 and 8 and 5' and 8', respectively, are held separated by pairs of vertical posts 15, 16, 17, 18, 19, 20 and 21, 15', 16', 17', 18', 19', 20' and 21'. These posts are preferably of angle bar structure and all, save the posts 18, 18' and 19, 19' have one vertical leg of the bar turned outwardly, while the posts 18—18' and 19—19' have the corresponding leg turned inwardly. This is done to economize space in order to accommodate the chain driving gearing 14. The side members of the frame are preferably held together by cross sills or members 22 and 23, and these cross members are preferably made of angle bars, secured to the vertical posts 16 and 16' and 17 and 17', respectively. The delivery end of the frame is more firmly held together by cross members on each side, consisting of the bars 24 and 25. These bars are connected to the frame, at their ends, by the same rivets that hold the posts 15, 15' and 16, 16' in place. This construction adds considerably to the strength and rigidy of the front, or delivery end of the conveyer, without increasing its weight to the same proportional extent.

The side angle bar members 8 and 8' are held together by a back plate 26, which with the vertical flanges of the side members 8 and 8', forms a trough between which, and within which the buckets 27 move when they are filled. The backing plate 26 prevents the material, being conveyed, from falling from the buckets and also serves as a guide for a bucket belt such as the chains 28 and 29 to which the buckets are attached.

When relatively coarse material, such as coal, is being conveyed, the backing plate 26, retains the material in association with the buckets so that it will be moved along the course while the buckets are traveling, although it may have fallen back of the buckets and be in contact with the plate.

The plate is curved at its bottom end, as at 30, and is provided with notches 31 and 32, through which the chains 28 and 29 pass, respectively. The plate is down-curved, so as to permit the buckets to pass freely without engaging its salient edge. It is furthermore curved at its delivery end, as at 33, and is provided with slots 34 and 35 to permit the chains 28 and 29 to pass therethrough.

Connected to the posts 20, 20' and 21, 21', respectively, are horizontal bars 35' and 36, upon which to support adjustable bearings 37 and 38 for the shaft 39 that carries conveyer belt pulleys such as sprocket wheels 40 and 41 for the chains 28 and 29, respectively. The bars, 35' and 36, are also braced by inclined bars 43, one on each side.

The conveyer is provided with a plurality of bails, of which three are shown, 45, 46 and 47. The bails are pivoted to each side of the structure, and preferably, to the side bars 8 and 8', by which the conveyer is adapted to be raised and lowered by the chains 48 and 49. The conveyer is substantially balanced when suspended by the bail 46 and the bails 45 and 47 are employed to change the altitude of the receiving and delivery ends to adjust it to proper position for work.

The delivery end of the conveyer is provided with bearing boxes 50, 50' for the shaft 51 which carries conveyer-belt pulleys such as sprocket wheels for the bucket carrying chains 28 and 29. These boxes are supported upon the vertical posts 15 and 15' by an intervening, forwardly projecting bracket 52, one on each side. A chain 53 extends from a sprocket wheel 54, on the shaft 55, to a sprocket wheel 56 on the shaft 51, and by this means the chains carrying the buckets are driven.

The bails, located as shown, constitute very handy or convenient means for moving the conveyer and adjusting it in position. By this means one man is enabled to substantially balance the conveyer in position by engaging the center bail, and move it along a track provided for the purpose and subsequently adjust the altitude of either end of the conveyer to suit conditions presented by use of either of the other bails.

While I have herein shown a single embodiment of my invention for the purpose of clear disclosure, it is manifest that changes may be made therein within the spirit and scope of the appended claim.

Having described my invention, what I claim is:—

A bucket conveyer comprising two parallel side frame elements spaced apart and held together by suitable means, said elements being deeper near the receiving end to form a knee and tapering therefrom toward both of their respective ends, each element having upper and lower longitudinally extending members, the upper members being bent to form said knee, and the lower straight members downturned at the receiving end to form feet upon which the conveyer rests when in operation, said feet permitting the conveyer buckets to pass; a continuous back plate extending between and secured to said upper frame members, bent to conform to said knee, said plate downturned at both its ends; a pair of chains supported on and guided by said back plate and movable thereon toward the delivery end; a series of buckets secured at intervals to said chains and arranged to be moved around the frame, under the structure and between said feet and means to drive said chains.

In testimony whereof I hereunto subscribed my name.

ARTHUR L. SHAW.